Aug. 13, 1963 C. C. CUTLER 3,100,892

ANTENNA FOR ACTIVE SATELLITE REPEATERS

Filed Dec. 1, 1960 2 Sheets-Sheet 1

INVENTOR
C. C. CUTLER
BY
ATTORNEY

ANTENNA FOR ACTIVE SATELLITE REPEATERS

Filed Dec. 1, 1960 2 Sheets-Sheet 2

INVENTOR
C. C. CUTLER
BY
[signature]
ATTORNEY

1

3,100,892

ANTENNA FOR ACTIVE SATELLITE REPEATERS

Cassius C. Cutler, Gillette, N.J., assignor to Bell Telephone Laboratories, Incorporated, New York, N.Y., a corporation of New York Filed Dec. 1, 1960, Ser. No. 73,121
8 Claims. (Cl. 343—100)

This invention relates to satellite vehicles and more particularly to a satellite vehicle having integral facilities to suit it for use as the active repeater station of a radio relay system.

Beginning even before the first successful launching of a satellite vehicle in predetermined orbit about the earth, there has been a constant stream of proposals for the use of such vehicles as stations in long distance radio communication systems. In the simplest form of such systems, the vehicle, as exemplified for example by the one hundred foot diameter metalized balloon used in the successful Echo I experiments, constitutes little more than a passive repeater whereby radio signals from one terminal station are intercepted and reflected to reach a second terminal station. While extremely sensitive receivers have permitted the successful operation of such passive repeater systems, greater transmission efficiency is available when the satellite vehicle performs the function of an active repeater, that is, when the satellite vehicle includes radio transmitting and receiving equipment arranged to provide a substantial increase in the level of received signals prior to their reradiation.

While many suggestions have been made for highly sophisticated active repeater satellites, limitations as to the payload capability of available launch vehicles and as to the degree of reliability attainable with complicated arrangements make it imperative that a lightweight and highly functional active repeater satellite be developed. Such a repeater must meet the minimum requirements of providing with high reliability a radio receiver and a radio transmitter with associated antennas capable of being carried into orbit without undue difficulty and then serving an unattended repeater station for long periods of time.

It is accordingly the object of the present invention to simplify and at the same time increase the reliability of satellite vehicles usable as repeater stations in long distance communication systems.

In accordance with the invention, there is provided a satellite vehicle capable of being "spin oriented" to maintain a chosen axis in predetermined relationship to the plane of the orbit in which the vehicle is launched and in which it is intended to travel thereafter. Contained within the vehicle are radio transmitting and receiving facilities. Also located within the vehicle are elements which cooperate to furnish two parallel-plate radiating regions which intersect the surface of the vehicle as peripheral slots substantially parallel in planes normal to the spin axis. These radiating regions are coupled respectively to the transmitter and the receiver and means are provided for eliminating or at least reducing to an acceptable value any cross-coupling of signals between the transmitting and receiving facilities.

The above and other features of the invention will be considered in detail in the following specification taken in connection with the drawings in which.

2

Figure 4:
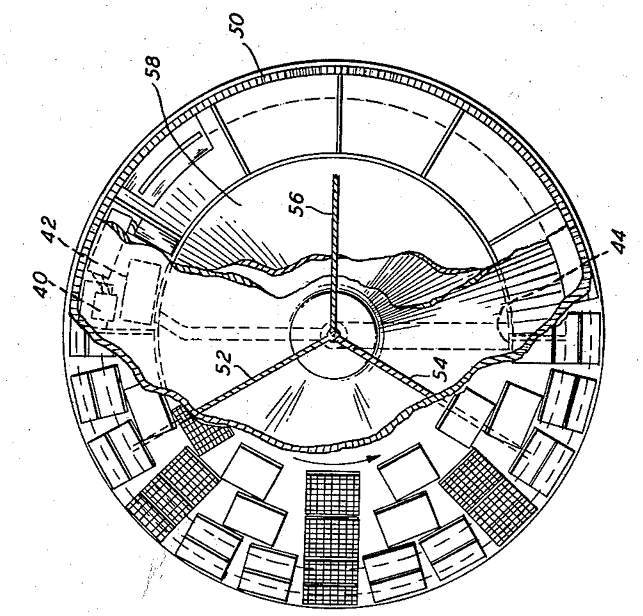
Figure 3:
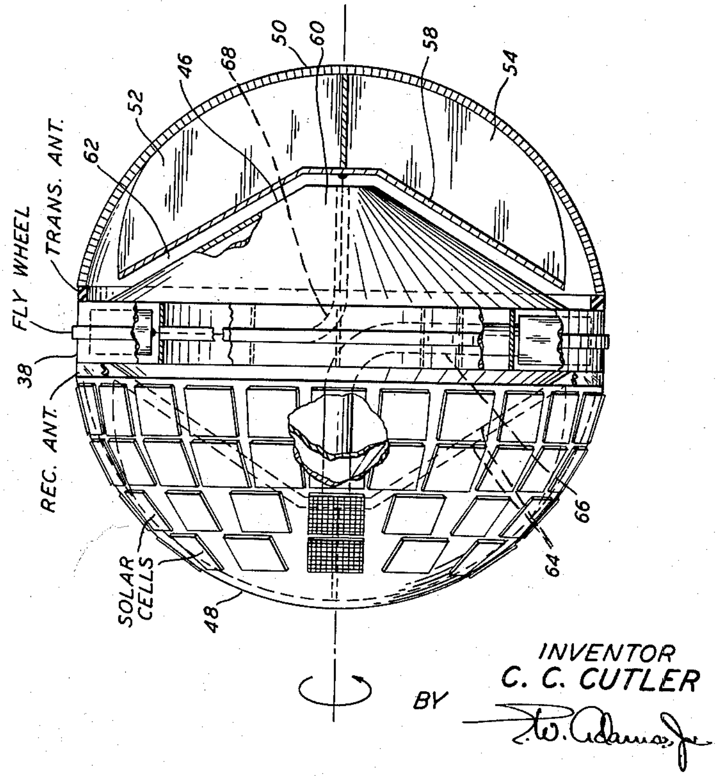
FIG. 3 is a front view of another embodiment of the invention partly broken away to illustrate certain of the interior arrangements.

FIG. 4 is a side view of the satellite vehicle of FIG. 3, also partly broken away to illustrate additional interior details.

The basic problem encountered in the design of a satellite vehicle for use as the active repeater of a communication system is that of fixing the spatial orientation of the vehicle in such a way that radio frequency signals from a terminal station may be received and reradiated to a second station with maximum efficiency. A related problem, however, is found in the requirements for simplicity and light weight which are imposed upon the vehicle if high reliability and long life are to be expected. According to the invention, these problems are met by employing the simplest form of orientation available to fix or control the orientation of the vehicle in space and then providing simple antenna structures compatible with the other requirements upon the vehicle which both provide an antenna pattern consistent with the form of orientation available and accomplish this without adding undue complexity to the structural arrangements of the vehicle.

Figure 2:
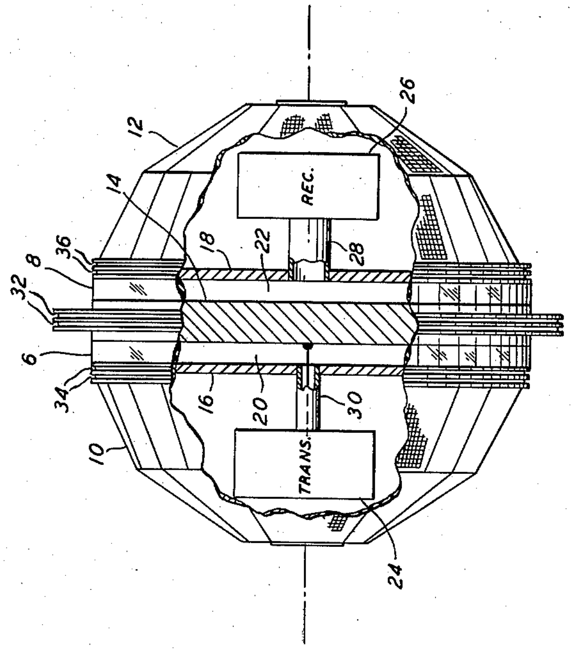
FIG. 2 is a view corresponding to that of FIG. 1 but broken away to show interior arrangements of the satellite vehicle.
Figure 1:
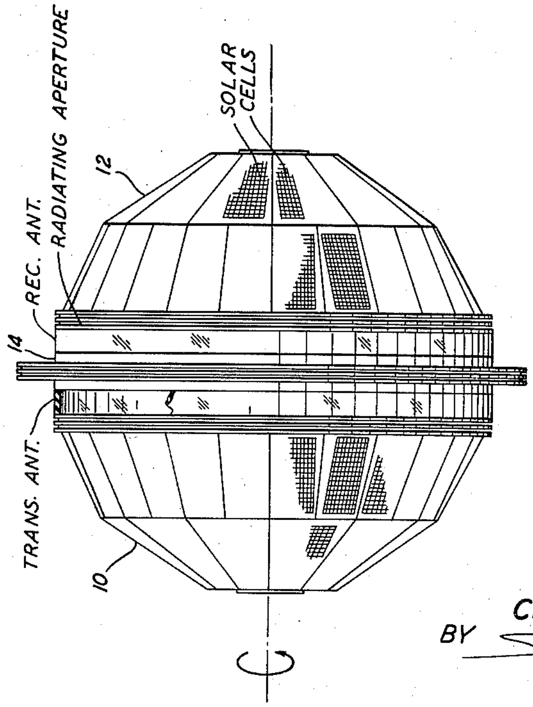
FIG. 1 is a front view of an active repeater satellite according to the invention.

One embodiment, according to the invention, is illustrated in FIGS. 1 and 2 of the drawings. Here, the satellite vehicle is essentially spherical in form and may be thought of as comprising first and second substantially hemispherical shells 10 and 12, assembled with an intermediate bulkhead 14 to form a sphere. Bulkhead 14 is shown as lying in a diametral plane normal to an indicated spin axis for the vehicle. If the mass of the vehicle is appropriately distributed, the indicated spin axis will correspond to the axis of greatest moment of inertia of the vehicle and the vehicle will tend, if launched spinning about this axis, to continue spinning about this axis through gyroscopic action. If, as is possible with available launching vehicles, the satellite is launched spinning about the axis of greatest moment of inertia and with this axis normal to the plane of the desired orbit, the vehicle will tend to continue in orbit with the spin axis always normal to this plane. Launching systems for accomplishing these requirements are already available and, in general, perform the necessary function by lifting the satellite vehicle into the desired orbit and in a desired orientation and thereupon imparting an initial spin of the vehicle either by auxiliary rockets or similar means.

It is seen, therefore, that the arrangements of FIG. 1 thus far described serve to provide for a satellite vehicle of controlled orientation. It remains to provide transmitting and receiving equipment which is compatible with this vehicle and which does not add to the complexity of either the vehicle or the launching system. This can be accomplished, according to the invention, through the use of parallel-plate or slot antennas utilizing bulkhead 14 as an element common to both the transmitting and receiving antennas. Thus, and as best shown in FIG. 2 of the drawings, bulkhead 14 may comprise a conducting member or at least comprise a structural member having opposed parallel-conducting surfaces. Hemispherical shells 10 and 12 are closed by diametral plates 16 and 18, respectively, of which the surfaces opposed to the bulkhead are also made conducting. Thus, bulkhead 14 and plate 16 define a parallel-plate radiating region 20, while bulkhead 14 and plate 18 define a second radiating region 22. As is indicated in the drawings, these parallel-plate radiating regions intersect the exterior surface of the satellite vehicle in essentially equatorial slots (with reference to the indicated spin axis). Support members may be provided to join the hemispherical shells 10 and 12 and bulkhead 14 or, and as shown, peripheral rings 6 and 8 of dielectric material bridge the slots and join the shells and bulkhead so that the vehicle has a substantially continuous external surface.

As indicated in FIG. 2, radio transmitting and receiving equipments 24 and 26, respectively, are mounted within the body of the satellite vehicle and are symmetrically disposed with respect to the spin axis thereof. These may constitute conventional microwave frequency radio equipments and typically make extensive use of solid-state devices, such as transistors and diodes, in order to reduce power requirements. Such power requirements are typically met through the use of solar cells, indicated in FIG. 1 as distributed over the surface of hemispherical shells 10 and 12. Included within the transmitting and receiving equipments 24 and 26 are lightweight rechargeable batteries of sufficient capacity to operate the radio transmitting and receiving equipments, these batteries being arranged for charging by the solar cells in accordance with now well-known practice.

It will be recognized that as the vehicle spins, each of the parallel-plate radiating or antenna regions 20 and 22 will produce a radiation pattern which is essentially toroidal in nature, with the plane of greatest radiation lying normal to the spin axis and with nulls lying along that axis. Thus, choice of the orbit in which the vehicle is launched will serve to position the radiation patterns of the transmitting and receiving antennas appropriately for transmission to and from spaced terminal stations on earth. Further, it is evident that this antenna arrangement avoids all problems of shadowing of the antennas by the body of the vehicle. Such shadowing has been a serious disadvantage in the use of dipole or whip antennas used heretofore and mounted on the exterior of the satellite vehicle. In addition to freedom from the shadowing problem, the configuration of the invention offers the advantage that no mechanism is required on the satellite vehicle to erect and support external antenna elements after the vehicle is placed in orbit. The ideal spherical vehicle shape is maintained prior to, during, and after launch.

Crosstalk or interference between the transmitting and receiving channels is avoided in the arrangement shown in FIG. 1 by coupling the transmitter 24 to radiating region 20 for energy in one polarization and receiver 26 and radiating region 22 for energy in another polarization. Conveniently, for example, the coupling between receiver 26 and region 22 may constitute a circular wave guide 28 by which energy is launched in or extracted from the radiating region in the circular electric mode. In this mode, the electric vector is parallel to the plates defining the radiating region. At the same time, the connection between transmitter 24 and region 20 may be by way of a coaxial line 30, the outer conductor of which terminates on plate 16 and the inner conductor of which extends across radiating region 20 to terminate on bulkhead 14. Waves are thus coupled to region 20 with the electric vector normal to plate 16 and bulkhead 14 so that the polarization of these waves is at right angles to that occurring in radiating region 22.

The coupling between transmitting and receiving antennas may be further reduced and the antenna patterns for the two polarizations made more closely the same through the use of peripheral one-quarter wave slots, such as 32, 34, and 36 provided on bulkhead 14 and adjacent to the radiating slots on the peripheries of hemispherical shells 10 and 12, respectively.

A modification of the satellite vehicle of FIGS. 1 and 2 is illustrated in FIGS. 3 and 4 of the drawings. Here, bulkhead 38 serves not only to define the transmitting and receiving antenna regions but also serves as a container for all of the transmitting and receiving electronic equipment and the necessary batteries for the operation of such equipment. Such equipment, indicated for example in FIG. 4 at 40, 42, and 44, is located about the periphery of the bulkhead and serves to enhance the flywheel effect of bulkhead 38 in fixing the axis of greatest moment of inertia normal to the plane about which both the bulkhead and the vehicle as a whole are symmetrical.

As shown in FIG. 3, the bulkhead is conveniently formed of a framework constituting a pair of right circular cones joined base-to-base with the bases lying in the plane normal to the indicated spin axis and with their vertices on that spin axis. The framework of the bulkhead is covered with a conducting surface 46 which may be either a sheet material or screening having a mesh appropriate to the wavelength of radio frequencies to be handled by the antennas. In some cases the latter may be preferred because it offers less interference to the internal transfer of heat between the various surfaces of the vehicle. Hollow shells 48 and 50 are secured to the periphery of bulkhead 38 to provide a substantially spherical exterior covering for the satellite vehicle. Within these shells, as shown for example in connection with shell 50, interior partitions 52, 54, and 56 serve as a framework to support a second conical conducting sheet or screen 58 which cooperates with conical surface 60 of bulkhead 38 to form a parallel-plate radiating region 62. A similar structural arrangement within exterior shell 48 provides a second parallel-plate radiating region indicated by the dashed lines 64 in FIG. 3 of the drawings.

As discussed above, the necessary radio transmitting and receiving equipment, together with appropriate batteries, is located within bulkhead 38 and disposed about the periphery thereof. As in the arrangement of FIG. 1, solar cells mounted on the exterior shells 48 and 50 serve as a source of power to recharge the batteries and maintain the satellite repeater in operation. Also, as in the arrangements of FIGS. 1 and 2, couplings, comprising for example a wave guide 66 and a coaxial line 68, are provided to interconnect the transmitter on one hand and the receiver on the other to the two parallel-plate radiating regions so that these elements may be coupled for the transmission of radio frequency energy in opposite and largely non-interfering polarizations. Although not shown, it will be understood that one-quarter wave slots may also be provided in the arrangments of FIGS. 3 and 4 in the same manner as those shown and discussed in connection with the embodiment of FIGS. 1 and 2.

In the arrangement of FIGS. 3 and 4, as in that of FIGS. 1 and 2, the beam width of the antennas, and thus the directivity of the repeater station, may be varied by changing the spacing of the plates defining the radiating regions.

What is claimed is:

1. A satellite vehicle for use as an active repeater in a long distance communication system comprising a vehicle body, a pair of parallel-plate radiating regions located within said body and communicating with the exterior thereof by way of slots extending about the periphery of said body, transmitting and receiving means within said body associated respectively with the first and second of said radiating regions, and means for reducing cross-coupling between radio signals in said first and second regions.

2. A satellite vehicle for use as an active repeater in a long distance communication system comprising a substantially spherical body adapted to be launched spinning in orbit, a pair of parallel-plate radiating regions located within said body and intersecting the surface thereof in parallel substantially equatorial slots, and transmitting and receiving means within said body associated respectively with the first and second of said radiating regions and coupled therewith for transmission of radio wave energy in opposite polarizations.

3. A satellite vehicle for use as an active repeater in a long distance communication system comprising a substantially spherical vehicle body having first and second hemispherical body portions, a bulkhead separating said body portions, a pair of parallel-plate radiating regions, each defined by a surface of said bulkhead and located within said body on opposite sides of said bulkhead and intersecting the exterior surface of the vehicle in slots, and transmitting and receiving means mounted about the periphery of said bulkhead and associated for the transmission of radio frequency energy with the first and second of said regions, the distribution of weight upon said bulkhead being arranged to promote rotation of the entire vehicle about an axis normal to said bulkhead at its center and serving as the axis of greatest moment of inertia for spin stabilization of said vehicle.

4. A satellite vehicle for use as an active repeater in a long distance communication system comprising first and second hemispherical body portions, each having a diametral surface which is conducting, a conducting bulkhead interposed between said body portions and in cooperation with the conducting diametral surfaces of said body portions defining a pair of parallel-plate radiating regions, transmitting and receiving means mounted in said vehicle, and means respectively interconnecting said transmittng and receiving means with the first and second of said radiating regions.

5. A satellite vehicle for use as an active repeater in a long distance communication system comprising first and second body portions, each defined by a hemispherical shell and a conical conducting surface having its vertex on the axis of generation of said shell and its base normal to said axis, a conducting bulkhead interposed between said body portions and comprising a pair of conical surfaces joined base-to-base with the bases normal to said axis and having the same vertex angles as said conducting surfaces of said body portions and lying on the same axis, said bulkhead in cooperation with said conducting surfaces of said body portions defining a pair of parallel-plate radiating regions, transmitting and receiving means mounted within said bulkhead, and means respectively coupling the first and second of said radiating regions to said transmitting and receiving means for the transmission of radio wave energy of different polarizations.

6. A satellite vehicle for use as an active repeater in a long distance communication system comprising a vehicle body, a pair of parallel-plate radiating regions located within said body and intersecting the exterior surface thereof in parallel slots extending about the periphery of said body, transmitting and receiving means within said body coupled respectively to the first and second of said parallel-plate regions for the radiation of radio frequency energy, and quarter-wave slots extending about the periphery of said body on either side of each of said radiating slots to prevent interaction between signals present in said first and second parallel-plate regions.

7. A satellite vehicle for use as an active repeater in a long distance communication system comprising first and second body portions, each having a plane conducting face, a flat conducting plate having an area at least sufficient to overlie either of said plane faces, means for supporting said first and second body portions and said flat plate in cooperative relation with said plane faces and said plate opposed to form two parallel-plate radiating regions having said flat plate common to both regions, transmitting and receiving means mounted respectively on said first and second body portions, and coupling means interconnecting said transmitting and receiving means and the radiating regions associated with the respective body portions for transmission of radio wave energy in opposite polarizations.

8. A satellite vehicle for use as an active repeater in a long distance communication system comprising an essentially spherical body having first and second body portions divided by a diametral bulkhead, the opposite sides of said bulkhead and conducting surfaces of said body portions parallel therewith, defining parallel-plate radiating regions intersecting the surface of said vehicle in parallel slots, and transmitting and receiving equipments coupled respectively to the first and second of said parallel-plate regions for the transmission of radio wave energy, said transmitting and receiving equipments being mounted upon said bulkhead about the periphery thereof to promote spinning of the entire vehicle about an axis normal to said bulkhead at the center thereof and acting as the axis of the greatest moment of inertia.

References Cited in the file of this patent

UNITED STATES PATENTS 2,602,895 Hansen ------------------ July 8, 1952

OTHER REFERENCES

I.R.E. Transactions on Antennas and Propagation, vol. Ap.-4, No. 1, January 1956, 86.